United States Patent [19]

Douce et al.

[11] 4,036,476
[45] July 19, 1977

[54] AUTOMATIC TAKE-UP WINCH

[76] Inventors: Donald R. Douce, 1517 Merced, Space 62, South El Monte, Calif. 91733; Wesley E. Buford, 1042 Wingate, Covina, Calif. 91723

[21] Appl. No.: 661,341
[22] Filed: Feb. 25, 1976
[51] Int. Cl.² ............................................. B66D 1/48
[52] U.S. Cl. .................................. 254/172; 74/128; 105/477
[58] Field of Search ............... 254/172, 173 R, 161, 254/173 B, 186 R, 187 R; 105/477; 242/67.1 R, 54 R; 74/128

[56] References Cited
U.S. PATENT DOCUMENTS

| 1,999,936 | 4/1935 | Lange | 254/172 |
| 2,758,569 | 8/1956 | Peterson | 74/128 |
| 3,255,857 | 6/1966 | Armstrong et al. | 74/128 |
| 3,608,864 | 9/1971 | Dargitz | 254/172 |

Primary Examiner—Albert J. Makay
Assistant Examiner—Kenneth Noland
Attorney, Agent, or Firm—William P. Green

[57] ABSTRACT

A winch for automatically taking up slack or looseness in a chain or the like and including a reel element having a ratchet mechanism for normally permitting rotation of the reel in only one direction, together with a power operated actuating unit which advances the reel and ratchet mechanism rotatively through successive steps in a take-up direction and is retractable in an opposite direction relative to the reel after each advancement step and in preparation for the next successive advancement. Automatic control means, desirably an automatic valve arrangement, cause such retraction of the power actuated unit in response to its arrival at a predetermined advanced position.

16 Claims, 12 Drawing Figures

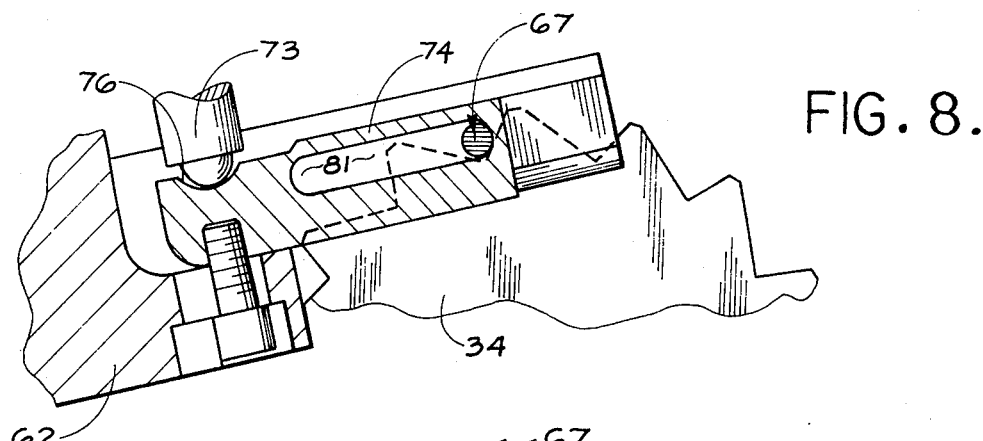
FIG. 8.
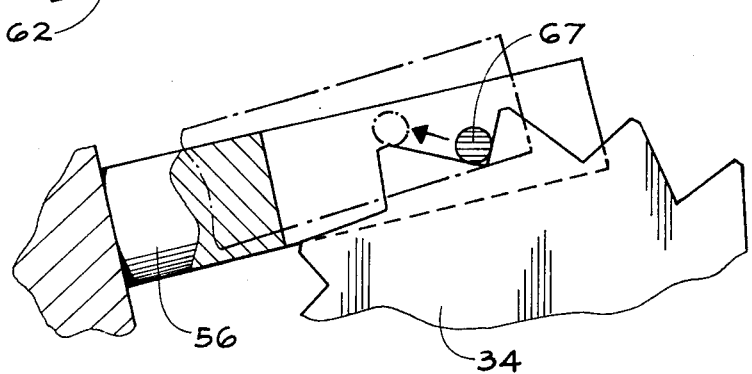
FIG. 9.
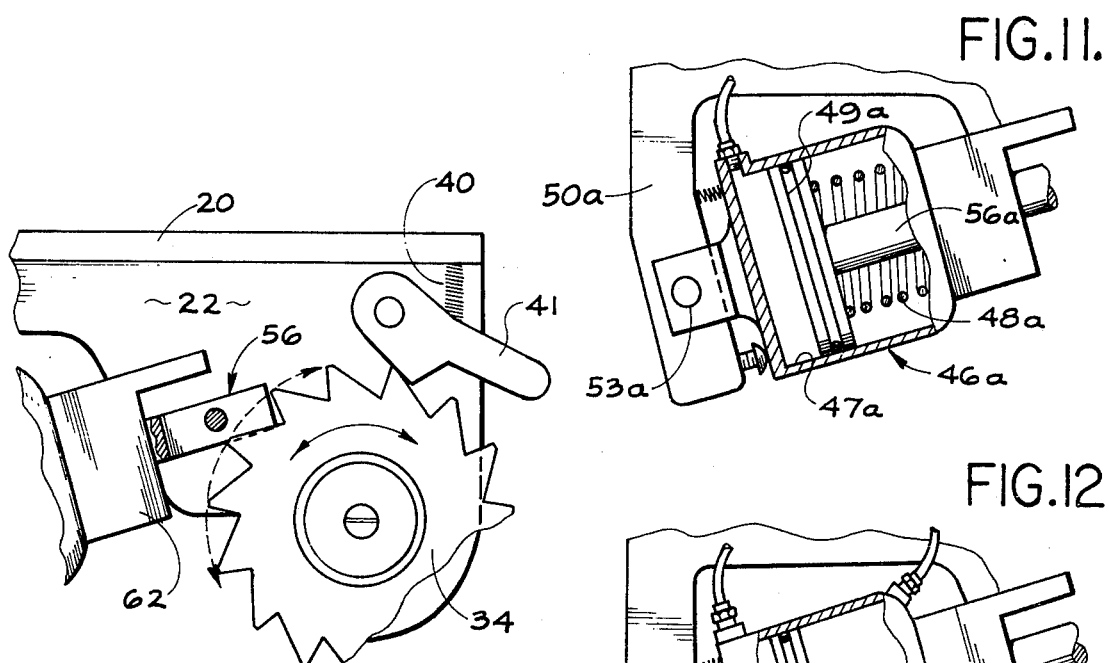
FIG. 11.
FIG. 10.
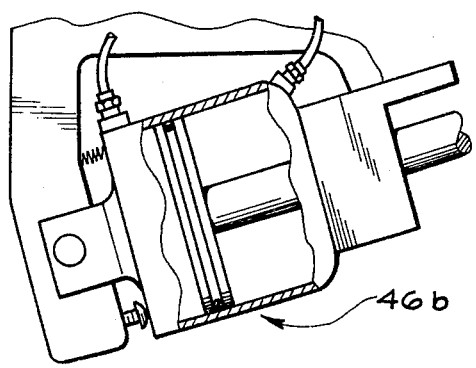
FIG. 12.

AUTOMATIC TAKE-UP WINCH

BACKGROUND OF THE INVENTION

This invention relates to improved winches about which there can be wound an elongated flexible member, such as a chain, cable, rope, or other similar element.

In transporting a load on a flatbed truck, open railroad car, or other similar vehicle or carrier, the items forming the load are frequently retained in fixed positions on the truck or other carrier during transportation by means of chains, cables or the like which are placed across the top of the load and connected to the supporting bed at opposite sides thereof. For tightening the chains or other lines about the load, there may be provided winches about which the elongated flexible members are windable to tighten them against the load. However, even though the chains or lines may be very tight when initially applied, they frequently become loosened as a result of the vibration of the load in transit, and when using conventional winches must therefore be tightened or checked at periodic intervals during every trip.

Some of the previously proposed winches capable of this type of use are shown in U.S. Pat. Nos. 2,946,563, 2,991,975, 3,077,791, 3,679,175 and 3,409,263. In an attempt to overcome the discussed loosening tendency, certain of these prior devices, specifically those shown in the first three listed patents, have incorporated spring take-up elements in an attempt to automatically wind the winch in a take-up direction upon development of looseness in the line or chain.

SUMMARY OF THE INVENTION

The present invention provides an improved automatic take-up winch which is adapted for the above discussed type of tie-down service, or other similar uses, and which will automatically turn in a take-up direction in response to the development of looseness in an associated flexible member, to continuously maintain that member in tightened condition. The device has a more positive take-up action than where a spring arrangement is employed and is not limited to the force which can be applied by a spring, or the variations in such force which inherently result when a spring is utilized, or to the limited range of rotary take-up of a spring.

To achieve these results, I employ a power unit which acts against the winding reel of the device to urge it rotatively in a take-up direction and which after rotary advancement of the reel through a predetermined angle is retractable relative to the reel, while the latter remains in its advanced position in preparation for a next successive advancing operation of the actuating unit. Thus, the actuating unit serves to rotate the reel through a series of successive advancing steps, with the reel being retained by a ratchet mechanism against retracting movement during retraction of the power actuated unit.

Desirably, the power unit acts against the teeth of a ratchet wheel, to first exert force against one of these teeth for rotating the wheel through a predetermined angle, and then retract into engagement with a next successive tooth for the next advancing operation, etc. The actuating unit may be a fluid operated unit, desirably a fluid pressure or vacuum actuated diaphragm or piston. Automatic control means may serve to cause retraction of the actuating unit when a predetermined point is reached on each advancing step, with these control means preferably consisting of valve means for controlling the flow of actuating fluid to and/or from the diaphragm, piston, or the like.

BRIEF DESCRIPTION OF THE DRAWINGS

The above and other features and objects of the invention will be better understood from the following detailed description of the typical embodiments illustrated in the accompanying drawings, in which:

FIG. 8 is a view similar to FIG. 6, but showing the diaphragm actuated parts in their fully advanced position;

FIG. 9 is a fragmentary section taken in the same plane as FIG. 4, but showing the parts in their fully advanced position of FIG. 8;

FIG. 10 is a view similar to FIGS. 4 and 9, but showing the diagram actuated parts in their fully retracted positions;

FIG. 11 is a view similar to FIG. 4, but showing a variational arrangement in which a piston is substituted for the diaphragm mechanism; and FIG. 12 is a view similar to FIG. 11, but showing use of a double acting piston.

DESCRIPTION OF THE PREFERRED EMBODIMENTS

Figure 1:
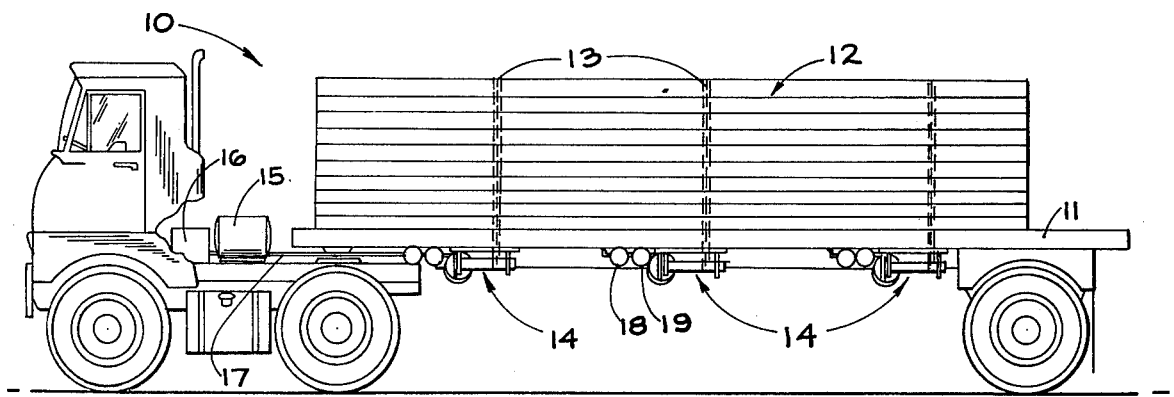
FIG. 1 is a side view of a truck utilizing a number of automatic take-up winches constructed in accordance with the invention.

Referring first to FIG. 1, there is represented generally at 10 a truck typically having a flatbed 11 on which a number of load units 12 are stacked. These load units may be a number of elongated pipes, logs, or any of various other types of items to be transported. The load is retained on the truck by several elongated flexible members 13, which may be cables, ropes, flat straps, or other similar retaining elements, but are typically illustrated in the drawings as chains. Each of the members 13 is retained at one end by an automatic take-up winch 14 constructed in accordance with the invention. These winches are desirably actuated by fluid, and more particularly may be operated either by hydraulic or pneumatic pressure, or vacuum. In the particular arrangement illustrated in the Figures, it may be assumed that the winches are pneumatically operated, being energized by pressurized air from an accumulation tank 15 fed by a compressor 16, with the compressed air being delivered to each winch through a line 17 and an individual manually actuated shut-off valve 18 and pressure regulator 19 maintaining the pressure of air to the winch at a predetermined value, say for example 100 psi.

Figure 2:
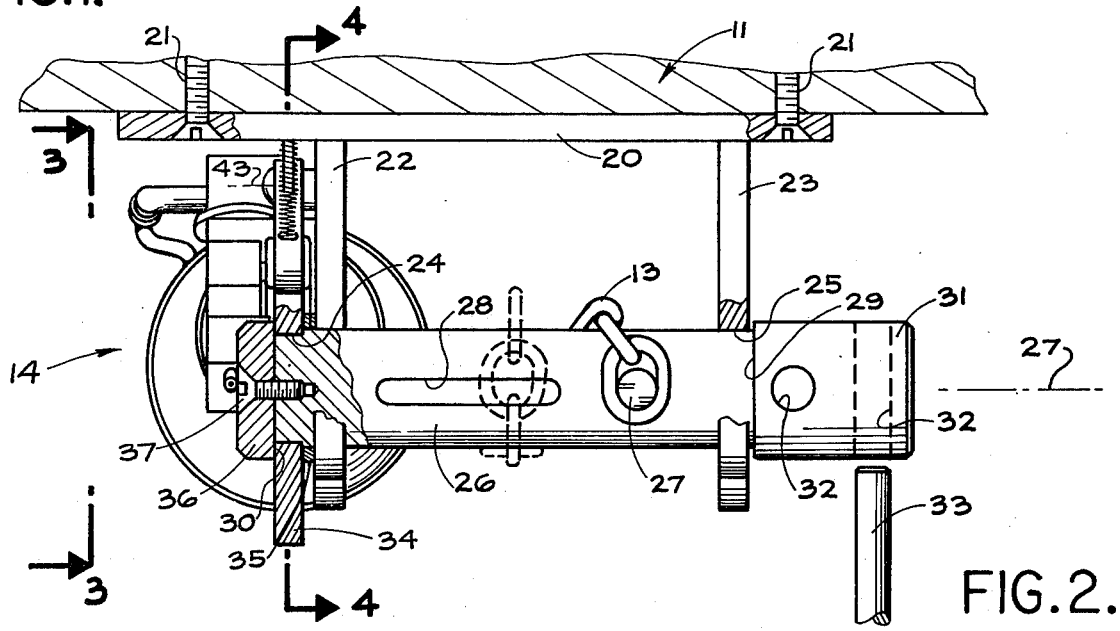
FIG. 2 is an enlarged view of one of the winches of FIG. 1.

The structural details of one of the winches 14 are illustrated in FIGS. 2 through 10. As seen in those figures, each of the winches may include a top mounting plate 20 which can be appropriately secured to the underside of an edge portion of truck bed 11, as by a number of screws 21. Projecting downwardly from plate 20, there are provided two spaced parallel vertical mounting plates 22 and 23 containing aligned circular openings 24 and 25 within which a shaft or reel element 26 is mounted for rotation about a horizontal axis 27. The end of chain 13 is windable about the shaft or reel element 26 axially between the plates 22 and 23, as seen in FIG. 2, and may have its end secured to the shaft in appropriate manner, as by reception of an end link of the chain about a radially outwardly projecting pin 27' carried by the shaft. If a cable or rope are utilized instead of the chain, they may be similarly attached to the pin 27', and if a flat belt is employed it may be connected to the shaft by extension of its end portion through an elongated axially extending slot 28 formed in the shaft. Except for the provision of pin 27' and slot 28, the shaft is externally cylindrical between plates 22 and 23, and within the openings 24 and 25 of those plates. To the right of plate 23, as viewed in FIG. 2, the shaft may have a shoulder 30 engaging axially against plate 23, and beyond this shoulder may have an increased diameter cylindrical portion 31, containing two cylindrical transverse passages 32 disposed perpendicularly with respect to one another for receiving the end of a cranking rod or bar 33 which can be utilized for manually turning shaft 26 when desired.

To the left of plate 22 in FIG. 2, shaft 26 rigidly carries a ratchet wheel 34, which may be secured to the shaft in any suitable manner, as by clamped retention between a washer 35 disposed about shaft 26 and a retaining cap 36, with the latter being secured to the end of the shaft by a screw 37, and with an appropriate key or spline being provided within the interior of the ratchet wheel for positively locking it in fixed rotary position relative to the shaft and for rotation therewith.

Figure 3:
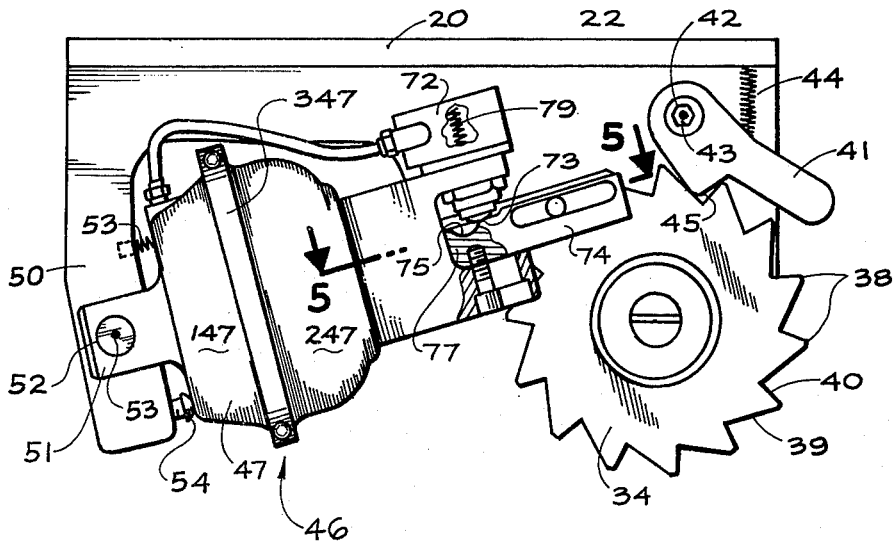
FIG. 3 is an end view taken on line 3—3 of FIG. 2.

As seen in FIG. 3, the ratchet wheel 34 has a series of evenly circularly spaced ratchet teeth 38, having gradually inclined leading faces 39 and more abruptly inclined generally radially extending trailing faces 40. A pawl element 41 is hinged by a mounting screw 42 or other element connected into vertical mounting plate 22 for pivotal movement about a horizontal axis 43 parallel to axis 27, and is yeildingly urged against teeth 38 by a spring 44 in a relation causing the coacting tooth 45 of the pawl to prevent counterclockwise rotation of the ratchet wheel as viewed in FIG. 3, while permitting clockwise rotation of that wheel. The clockwise rotation is in a direction to wind chain 13 more tightly on shaft 26.

For advancing the ratchet wheel 34 in a clockwise take-up direction as viewed in FIG. 3, there is provided in the form of the invention shown in that figure a pneumatically operated diaphragm type power unit 46. This unit includes a body 47 which may be formed of two complementary sections 147 and 247 secured together by a peripheral annular clamp 347. This clamp also serves to tighten the annular edges of body sections 147 and 247 against opposite sides of the annular outer edge 48 of a circular flexible diaphragm 49 which may normally have the concave configuration illustrated in FIG. 4, and which forms an airtight seal between the left side and right side of body 47. This body is mounted pivotally to a downwardly projecting mounting post or column 50 connected at its upper end to top plate 20 of the device, with the pivotal connection consisting, in the illustrated form of the invention, of two lugs 51 projecting leftwardly from body 47 as viewed in FIG. 3, and connected by a pivot pin or screw 52 to mounting post 50 for pivotal movement about an axis 53 parallel to axis 27. A coil spring 53' bears at opposite ends against an upper portion of body 47 and post 50 to yieldingly urge diaphragm unit 46 downwardly about its axis 53, and to a position determined by engagement with the head of a screw 54 which is threadedly connected into the lower portion of post 50.

Figure 4:
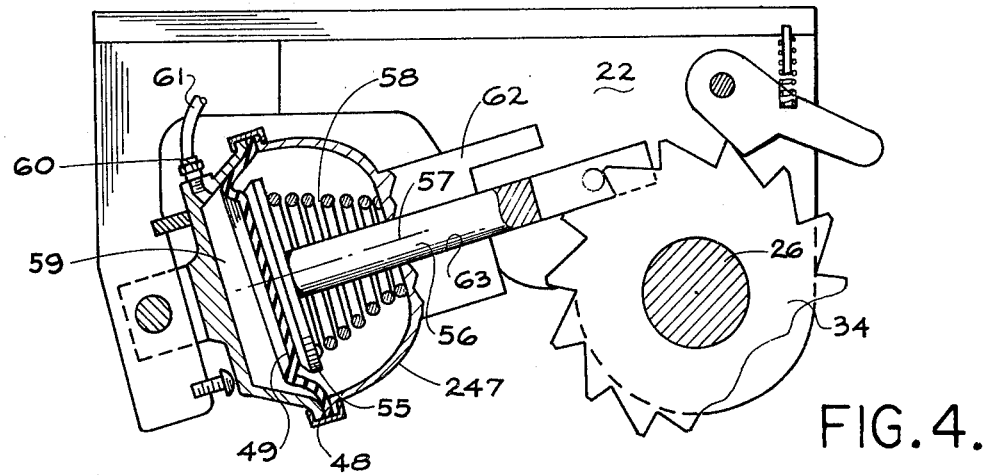
FIG. 4 is a transverse vertical section taken on line 4—4 of FIG. 2.
Figure 5:
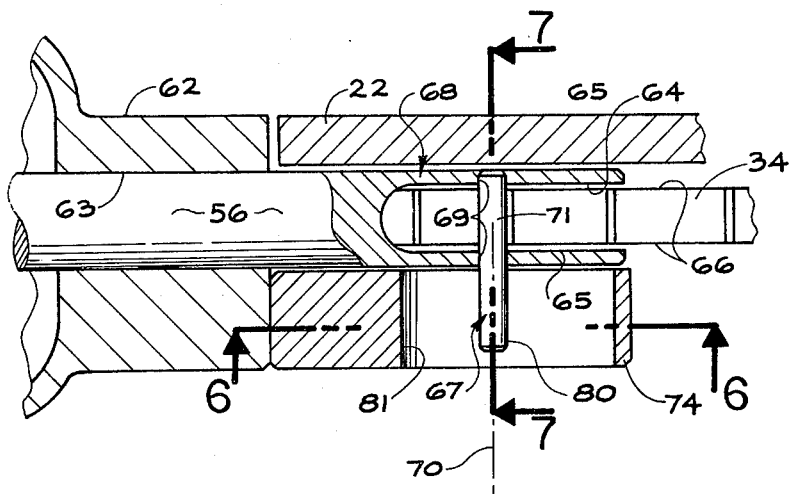
FIG. 5 is a fragmentary section taken on line 5—5 of FIG. 3.
Figure 6:
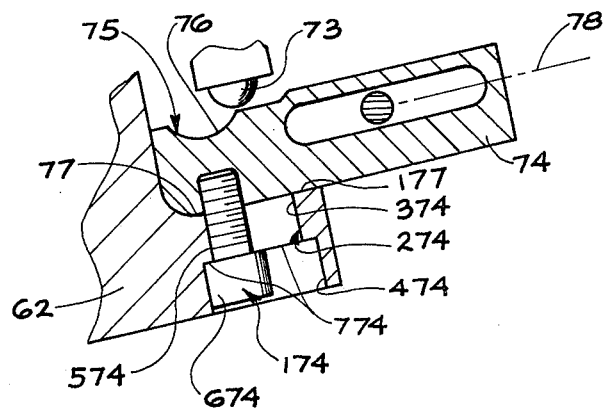
FIGS. 6 and 7 are fragmentary vertical sections taken on lines 6—6 and 7—7 respectively of FIG. 5.

At its right side as viewed in FIG. 4, the diaphragm 49 acts rightwardly against a rigid metal disk 55, which carries a rod 56 adapted to be actuated axially along its longitudinal axis 57 by pneumatically induced movement of the diaphragm. A coil spring 58 interposed between body section 247 and disc 55 yieldingly returns elements 55 and 56 and the diaphragm leftwardly except when the diaphragm is urged in a rightward direction by air pressure at the left side of the diaphragm. This air may be supplied to the chamber 59 at the left of the diaphragm through an air inlet fitting 60 communicating with a pressure supply line 61.

Projecting from its right side as vewed in FIG. 4, the right hand section 247 of diaphragm containing body 47 carries a projection 62, containing an inner cylindrical bore 63 within which the externally cylindrical rod 56 is slidably received and guided for the desired axial movement. At its extremity, rod 56 may be bifurcated to form a slot 64 (FIGS. 5 and 7), defined by two parallel vertical side surfaces 65 spaced apart a distance corresponding to the axial thickness of ratchet wheel 34, to slidably engage the opposite planar side surfaces 66 of that ratchet wheel in a relation locating the ratchet wheel axially relative to rod 56 while permitting rotation of the wheel. A cylindrical pin 67 is carried rigidly by the bifurcated end 68 of rod 56, typically by pressed fit reception within aligned openings 69 formed in the two halves of the pin, with the longitudinal axis 70 of the pin extending parallel to the rotary axis of the ratchet wheel, so that the portion 71 of the pin between the two side portions of rod 56 can engage the abruptly inclined trailing faces 40 of ratchet teeth 38 to exert force thereagainst in a relation turning the ratchet wheel in a clockwise direction as viewed in FIG. 4 upon rightward movement of rod 56.

Figure 7:
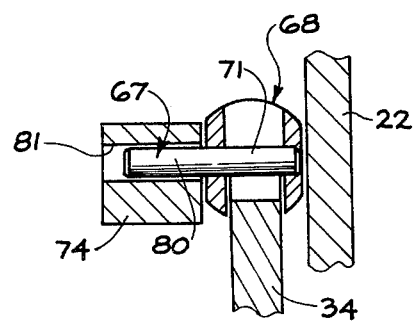

At the left side of rod 56 and the ratchet wheel as viewed in FIGS. 2 and 7, the previously mentioned projection 62 carried by the diaphragm housing 47 mounts an automatically operated three-way air valve 72, which is connected into the air supply line between the associated regulator valve 19 of FIG. 1 and line 61 leading to the pressure chamber behind diaphragm 49. This valve may be normally retained by an internal spring 79 in a position to admit pressurized air into the diaphragm actuating chamber 59 of FIG. 4, but adapted to be actuated to a second condition for closing off the supply of pressure fluid to the diaphragm and exhausting air from diaphragm chamber 59 to the atmosphere. The valve is actuated to this second exhausting condition by upward deflection of a lower spherically convex actuating element 73 of the valve against the tendency of spring 79. A cam element 74 controls operation of this value, and for that purpose has a recess 75 at its upper side (FIGS. 3 and 6), defined by an upwardly facing cam surface 76 which is engaged by spherical valve actuator 73. Slide 74 is mounted and guided within a guideway 77 in part 62 for sliding movement along an axis 78 relative to part 62 between the retracted position of FIG. 3 and the actuated position of FIG. 8. The slide may be movably retained in the guideway in any suitable manner, preferably by a screw 174 connected upwardly into slide 74 through a slot 274 having upper and lower portions 374 and 474 within which the shank 574 and head 674 of the screw are confined to guide element 74 for only the desired movement parallel to axis 78. As will be apparent, the engagement of head 674 of the screw upwardly against a shoulder 774 effectively holds element 74 downwardly in sliding engagement with an upwardly facing surface 177 forming the bottom wall of guideway 77.

In the FIG. 3 retracted position of slide 74, spherical element 73 is allowed to move downwardly, under the influence of coil spring 79, which in that condition holds the valve in its open diaphragm actuating position. Rightward movement of can element 74 relative to its carrier projection 62 causes cam surface 75 to deflect spherical element 73 upwardly to its position for closing off the supply of pressurized air to diaphragm chamber 59 and exhausting that chamber to atmosphere.

The valve controlling cam slide 74 is moved along its axis 78 between these two positions by reception of a laterally projecting end portion 80 of pin 67 within an elongated slot 81 formed in part 74. This portion of pin 67 engages the ends of slot 81 at the ends of the range of travel of pin 67, to actuate the valve at times which will be discussed more precisely hereinbelow.

To now describe the use of the device of FIGS. 1 to 10, assume that one of the chains 13 has been placed about the load 12, and the end of the chain has been wrapped about the reel or shaft element 26 of the winch to the condition illustrated in FIG. 2, with the extremity of the chain being connected to pin 27' of the shaft. Rod 33 may be utilized to turn the shaft to initially tighten the chain about the load if desired. When valve 18 is opened to pass air at a predetermined pressure to automatic valve 72, this places the apparatus in a condition in which the winch will automatically turn shaft 26 through successive take-up steps to whatever extent and at whatever times it may be necessary to maintain the chain completely tight on the load. If the chain is initially tightened, the parts at the outset may be in the positions illustrated in FIGS. 2 through 7, in which pin 67 exerts forces rightwardly against an engaged one of the teeth 38 of the ratchet wheel 34, to urge that ratchet wheel and the connected shaft 26 in a clockwise (FIG. 3) take-up direction with the force which is exerted against diaphragm 49 by air contained within chamber 59 of the diaphragm housing. As long as the chain remains tight, the resistance offered by the chain prevents rotation of the ratchet wheel and shaft 26 by the force exerted by the diaphragm. If the chain becomes loose on the load, however, the force exerted by the diaphragm acts to move rod 56 rightwardly in FIG. 4, with resultant rightward movement of the carried pin 67, which acts through the engaged ratchet tooth 38 to turn the ratchet wheel 34 in a chain take-up direction until the parts reach the positions illustrated in FIG. 8. Just prior to arrival at the FIG. 8 position, the pin 67 engages the right end of slot 81 in cam element 74, to shift that cam element slightly rightwardly relative to the mounting part 62, as seen in FIG. 8, and to thereby actuate the three-way valve 72 for closing off the delivery of pressure fluid to the diaphragm and instead placing diaphragm chamber 59 in communication with the atmosphere to release the pressure exerted against the diaphragm and allow spring 58 to return the diaphragm and connected rod 56 leftwardly to the positions illustrated in FIG. 10. During such leftward movement of pin 67, the pin rides upwardly over the next successive ratchet tooth 38 (see broken line position of FIG. 9), with this action being permitted by slight upward pivotal movement of the entire assembly 46 and carried parts about axis 53, and with the pin being returned downwardly by spring 53' as soon as it has passed that ratchet tooth, to thereby be positioned for actuating that next tooth rightwardly. The final portion of the leftward movement of diaphragm actuated pin 67 (to the fully retracted position of FIG. 10), causes the pin to engage the left end of slot 81 in cam element 74, to move element 74 leftwardly and back to the position of FIG. 3 relative to the mounting structure 62, so that valve 72 is returned to its original position for supplying compressed air to the left side of the diaphragm and exerting advancing force against the ratchet wheel. This entire cycle can be repeated as many times as may be necessary to take up all of the slack in the chain, and to continuously maintain the chain in a tightened load retaining condition.

FIG. 11 shows a variational arrangement which may be considered as identical with that of FIGS. 1 to 10 except that there is substituted for the diaphragm assembly 46 of the first form of the invention a piston and cylinder mechanism 46a, having a cylinder 47a pivoted to the support post 50a at 53a, and containing a piston 49a having a piston rod 56a coacting with a ratchet wheel 34a and valve cam 74a in the same manner discussed in connection with the first arrangement. This may be a single acting piston, returned leftwardly by a coil spring 58a similar to spring 58 of FIG. 4.

Alternatively, either the diaphragm of the first form of the invention or the piston of FIG. 11 may be double acting, that is, adapted to be urged in both directions by pneumatic or hydraulic fluid pressure. FIG. 12 represents typically a double acting piston arrangement 46b, in which a valve 72b actuated by a cam element 74b serves to control delivery of pressure fluid to and from both ends of the cylinder, and induces piston movement of the same type discussed in detail in connection with the first form of the invention.

As an additional feature of the forms of the invention illustrated in FIGS. 1 through 11, it is noted that when the compressed air to the winch is closed off completely, by closure of the associated shut-off valve 18, the return spring 58 or 58a retracts rod 56 or 56a and the carried pin 67 or 67a far enough to position that pin completely out of the path of rotary movement of ratchet teeth 38 (as to the fully retracted position illustrated in FIG. 10), so that the shaft 26 or the corresponding shaft of FIG. 11 may be manually turned by tool 33 to completely unwind the chain from shaft 26 and permit its removal from the winch and load. The double acting piston of FIG. 12 may similarly be designed to return to a fully retracted position out of the path of the ratchet wheel when all air to the device is shut off.

While certain specific embodiments of the present invention have been disclosed as typical, the invention is of course not limited to these particular forms, but rather is applicable broadly to all such variations as fall within the scope of the appended claims.

We claim:

1. An automatic take-up winch comprising:
a reel element mounted for rotation about an axis and about which an elongated flexible member is to be wound;
a ratchet mechanism permitting rotation of said reel element in a take-up direction through a series of different positions and adapted to releasably prevent rotation of said element in a reverse unwinding direction from said different positions; and a power unit including a power actuated part operable upon movement in one direction to turn said reel element in said take-up direction from one of said positions to another;

said part then being retractable in an opposite direction relative to said reel element in preparation for another take-up step, while the reel element is retained by said ratchet mechanism against rotation in said unwinding, direction; said power actuated part being automatically operated to wind said flexible member to a desired tension when said part senses a slack condition in said flexible member.

2. An automatic take-up winch as recited in claim 1, in which said ratchet mechanism includes a ratchet wheel having a series of ratchet teeth and operatively connected to said reel element for rotation in correspondence with the rotation thereof, and a pawl yieldingly urged against said teeth and engageable therewith to permit said rotation of the reel element in said take-up direction but block rotation in said reverse unwinding direction.

3. An automatic take-up winch as recited in claim 1, in which said ratchet machanism includes a ratchet wheel operatively connected to said reel element to turn the reel element in response to rotation of the ratchet wheel, and a pawl co-acting with said wheel to block unwinding rotation thereof;

said power actuated part of said power unit being engageable with said ratchet wheel to turn it and the reel element in said take-up direction.

4. An automatic take-up winch as recited in claim 1, in which said ratchet mechanism includes a ratchet wheel having a series of ratchet teeth and operatively connected to said reel element to turn it in response to rotation of the ratchet wheel, and a pawl engageable with said teeth to permit take-up rotation but prevent reverse rotation of the ratchet wheel and reel element;

said power actuated part of said power unit being engageable successively with different ones of said ratchet teeth, and retractable relative thereto to advance said ratchet wheel and reel element through a series of successive takeup steps.

5. An automatic take-up winch as recited in claim 1, in which said power unit is a fluid actuated unit in which said power actuated part is reciprocable in opposite directions.

6. An automatic take-up winch as recited in claim 1, in which said ratchet mechanism includes a ratchet wheel for driving said reel element rotatively and having a series of ratchet teeth, said power unit being a fluid actuated unit in which said power actuated part is movable in opposite directions and exerts force against different ones of said teeth successively to rotate the ratchet wheel and reel element through a series of successive steps.

7. An automatic take-up winch as recited in claim 1, in which said ratchet mechanism includes a ratchet wheel for driving said reel element and having a series of ratchet teeth, said power actuated part being engageable successively with said teeth to advance the ratchet wheel and reel element through a series of take-up steps, there being means mounting said power unit and said power actuated part thereof for limited swinging movement in a relation enabling said part to pass one of said ratchet teeth during retraction of said part in said opposite direction.

8. An automatic take-up winch as recited in claim 1, in which said ratchet mechanism includes a ratchet wheel for driving said reel element and having a series of ratchet teeth, said power actuated part being operable to act against different ones of said teeth successively to advance said ratchet wheel and reel element through successive take-up steps, and said part upon retraction in said opposite direction being retractable to a position in which it does not interfere with rotation of the ratchet wheel and reel element in said unwinding direction.

9. An automatic take-up winch as recited in claim 1, including automatic control means responsive to movement of said power actuated part in said one direction to a predetermined position to automatically cause reverse movement of said part in said opposite direction for a next successive take-up step.

10. An automatic take-up winch as recited in claim 1, in which said power unit is a fluid actuated unit in which said power actuated part is reciprocable in opposite directions to advance said reel element through successive take-up steps, there being automatic valve means responsive to movement of said power actuated part in said one direction to a predetermined position to cause said fluid actuated unit to retract said part in said opposite retracting direction.

11. An automatic take-up winch as recited in claim 1, in which said power actuated unit and said part thereof continuously exert force tending to turn said reel element in said take-up direction until said part reaches a predetermined advanced position from which it is retractable in said opposite direction.

12. An automatic take-up winch as recited in claim 1, in which said ratchet mechanism includes a ratchet wheel having a series of ratchet teeth and operatively connected to said reel element to drive it rotatively, and a pawl yieldingly urged against said teeth;

said power actuated unit being fluid operable and including a body mounting said part for essentially linear fluid induced reciprocation relative to said body;

said part being engageable successively with different ones of said ratchet teeth to advance said ratchet wheel and reel element through successive steps in take-up direction;

there being bing valve means responsive to movement of said power actuated part in said one direction to a predetermined advanced position to cause retracting movement of said part in said opposite direction to engage and act against another of said teeth.

13. An automatic take-up winch as recited in claim 12, including means mounting said body and said power actuated part for swinging movement to enable the power actuated part upon movement in said opposite direction to pass one of said ratchet teeth, said power actuated part upon full retraction being movable to a position out of the path of movement of said ratchet teeth upon unwinding rotation of the ratchet wheel and reel element to avoid interference with such unwinding rotation.

14. An automatic take-up winch comprising:
a reel element mounted for rotation about an axis and about which an elongated flexible member is to be wound;
a ratchet wheel having a series of ratchet teeth and operatively connected to said reel element for rotation in correspondence with the rotation thereof;

a pawl yieldingly urged against said teeth and engageable therewith in a relation permitting rotation of said reel element in a predetermined take-up direction through a series of different positions but releasably blocking rotation of the reel element in a reverse unwinding direction from said different positions;

a power unit including a power actuated part operable upon movement in one direction to turn said reel element in said take-up direction from one of said positions to another;

said part then being retractable in an opposite direction relative to said reel element in preparation for another take-up step, while the reel element is retained by said pawl and ratchet wheel against rotation in said unwinding direction; and means for retracting said pawl to released position permitting rotation of the ratchet wheel and reel element in said unwinding direction; said power actuated part being automatically operated to wind said flexible member to a desired tension when said part senses a slack condition in said flexible member.

15. An automatic take-up winch as recited in claim 14, in which said power actuated part is operable to act against different ones of said teeth successively to advance said ratchet wheel and reel element through successive take-up steps, and said power actuated part upon retraction in said opposite direction is retractable to a position in which it does not interfere with rotation of the ratchet wheel and reel element in said unwinding direction.

16. An automatic take-up winch as recited in claim 14, in which said power unit is fluid operable and includes a body mounting said part for essentially linear fluid induced reciprocation relative to said body, said part being engageable successively with different ones of said ratchet teeth to advance said ratchet wheel and reel element through successive steps in take-up direction, there being valve means responsive to movement of said power actuated part in said one direction to a predetermined advanced position to cause retracting movement of said part in said opposite direction to engage and act against another of said teeth, and means mounting said body and said power actuated part for swinging movement in a relation enabling the power actuated part upon movement in said opposite direction to pass one of said ratchet teeth, said power actuated part upon full retraction being movable to a position out of the path of movement of said ratchet teeth upon unwinding rotation of the ratchet wheel and reel element to avoid interference with such unwinding rotation.

* * * * *